United States Patent
Tischer et al.

(10) Patent No.: US 10,266,040 B2
(45) Date of Patent: Apr. 23, 2019

(54) VEHICLE ROOF BASE FRAME

(71) Applicant: Webasto SE, Stockdorf (DE)

(72) Inventors: Oliver Tischer, Stockdorf (DE);
Wolfgang Richter, Stockdorf (DE);
Jason Bowles, Owosso, MI (US); Ryan Mitchell, Novi, MI (US)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/706,098

(22) Filed: Sep. 15, 2017

(65) Prior Publication Data

US 2019/0084390 A1    Mar. 21, 2019

(51) Int. Cl.
*B60J 7/10* (2006.01)
*B60J 7/12* (2006.01)
*B60J 10/90* (2016.01)

(52) U.S. Cl.
CPC ............... *B60J 7/10* (2013.01); *B60J 7/1291* (2013.01); *B60J 10/90* (2016.02); *B60Y 2304/078* (2013.01)

(58) Field of Classification Search
CPC ..... B60J 10/90; B60J 7/10; B60J 7/102; B60J 7/08
USPC ........................ 296/216.07–216.08, 218, 219
See application file for complete search history.

(56) References Cited

U.S. PATENT DOCUMENTS

| | | | |
|---|---|---|---|
| 6,467,837 B1* | 10/2002 | Tolinski | B60J 10/82 296/213 |
| 2009/0146465 A1* | 6/2009 | Lewis | B60J 7/146 296/218 |
| 2018/0037098 A1* | 2/2018 | Haberkamp | B60J 7/1291 |

* cited by examiner

*Primary Examiner* — Dennis H Pedder
(74) *Attorney, Agent, or Firm* — Fitch, Even, Tabin & Flannery, LLP (57) ABSTRACT

A vehicle roof base frame is provided, which can be placed on top of an edge area of a vehicle roof structure delimiting a roof opening, having two longitudinal legs and a transverse leg connecting the two longitudinal legs to each other, the legs being realized as separate parts. A seal is arranged between each of the longitudinal legs and the transverse leg when in an assembly position in which the legs are firmly connected to each other.

8 Claims, 7 Drawing Sheets

Fig. 10

VEHICLE ROOF BASE FRAME

FIELD

The invention relates to a roof opening system for closing or at least partially opening, as required, a roof opening having a vehicle roof base frame for being placed on top of an edge area of a vehicle roof structure delimiting the roof opening.

BACKGROUND

Passenger cars having vehicle roofs are known from practice and are realized as off-road vehicles or SUVs (Sports Utility Vehicles). For this purpose, the vehicle roof, which is commonly a fixed roof, comprises a roof opening which is arranged above a driver's seat and a passenger seat and which can be closed or at least partially opened by means of a sliding-roof arrangement. The sliding-roof arrangement is integrally incorporated in the roof structure and can be replaced by a roof opening system realized as an interchangeable insert and comprising a vehicle roof base frame.

Such a roof opening system is known from US 2015/0352937 A1 and comprises a vehicle roof base frame having two longitudinal legs, which are directed in the longitudinal direction of the vehicle when the base frame is installed, and a transverse leg, which is directed in the transverse direction of the vehicle and connects the two longitudinal legs to each other. The two longitudinal legs and the transverse leg are realized as separate parts, thereby forming a base frame having multiple parts.

The roof opening system can be realized in multiple parts in order to lower costs for transport and logistics. As a result, the roof opening system can be sent in a small package, for example. The roof opening system can subsequently be assembled or disassembled by a user of the respective vehicle as needed or desired. Altering the roof structure itself, on which the interchangeable insert can be placed, is not necessary in this instance. The interchangeable insert comprises the vehicle roof base frame which follows an edge of the roof opening. The base frame represents the element of the interchangeable insert which serves for connecting the roof opening system to the roof structure.

The base frame known from the document mentioned above, however, is not without problems in regard of sealing a vehicle interior off from environmental influences such as wind or wetness since the base frame does not comprise a corresponding element for protecting a vehicle interior accordingly.

SUMMARY

It is therefore the object of the invention to create a roof opening system having a multipart vehicle roof base frame which enables better protecting a vehicle interior from environmental influences.

According to the invention, this object is attained by the vehicle roof base frame having the features of claim 1.

Hence, a roof opening system is proposed which is realized as an interchangeable insert so as to be detachably fixable to a roof structure of a vehicle roof and which comprises a vehicle roof base frame which can be placed on top of an edge area of the roof structure delimiting a roof opening. The proposed vehicle roof base frame comprises two longitudinal legs and a transverse leg connecting the two longitudinal legs to each other, said legs being realized as separate parts. Moreover, a seal is arranged between each longitudinal leg and the transverse leg when in an assembly position in which the legs are firmly connected to each other. The vehicle roof base frame thus has an approximately U-shaped outline.

By being realized in multiple parts, bumper areas inevitably arise in the base frame between adjoining legs. Advantageously, the vehicle interior is protected from environmental influences by a seal in the bumper areas.

In such a vehicle roof base frame, it is thus possible for the base frame to be transported and/or shipped when in a transport position in which the longitudinal legs and the transverse leg are arranged to each other in such a manner that they take up less space than when in the assembly position. Through this, the shipping costs are lowered due to the lower shipping volume. Once an end customer receives the parcel, they can build the base frame together and the seals can be arranged, thereby realizing the assembly position. The base frame can then be placed on top of the roof opening's edge area of the vehicle roof structure.

In a preferred embodiment of the roof opening system according to the invention, the two longitudinal legs are each arranged on the transverse leg via a hinge. Such an embodiment enables a low shipping volume as well as a simple assembly for establishing the assembly position. The two longitudinal legs can be easily folded into the assembly position by an end customer. It is also conceivable that the seals are already assembled or that the customer inserts the seals in the respective position.

In another preferred embodiment of the roof opening system according to the invention, the pivot axes of the hinges extend mostly parallel to the transverse leg. When arranging the base frame on a vehicle, the pivot axes of the hinges thus mostly extend in the transverse direction of the vehicle. Such hinges lead to the longitudinal legs being able to be pivoted in the longitudinal direction of the vehicle and to having any length since they do not impede each other when in the transport position should they be pivoted towards each other when in the transport position.

In another preferred embodiment of the roof opening system according to the invention, the two longitudinal legs are connected to the transverse leg by means of screws and/or rivets when in the assembly position. It is conceivable that the two longitudinal legs are either only screwed or riveted to the transverse leg so as to be fixed in the assembly position or are screwed or riveted together in addition to having hinges. Such a connection enables durability and a sufficient rigidity of the vehicle roof base frame.

In order for a user of the respective vehicle to be able to install the vehicle roof base frame on the roof structure as easily as possible, the base frame is fastened to the roof structure preferably via manually detachable fixing elements. The manually detachable fixing elements are, for example, handle screws which engage through the roof structure from underneath. Preferably, two handle screws engage through the roof structure from underneath in the area of each lateral roof beam in order to engage with corresponding threads of the base frame, which engages over the roof structure, from underneath.

In another preferred embodiment of the roof opening system according to the invention, the seals are flat seals. Flat seals can, for example, be cut from a seal band or be produced by means of a corresponding method. Such flat seals are suitable for being assembled in positions having complex geometric shapes due to their oblong design since they can easily shape themselves to a surface at the assembly position.

In a preferred embodiment of the roof opening system according to the invention, the seals are each arranged such when in the assembly position that each seal engages an abutment surface of the respective longitudinal leg from underneath and engages over an abutment surface of the respective transverse leg. Thus, an even more secure seal can be produced. Moreover, a seal can be hooked between the longitudinal leg and the transverse leg in this manner, which leads to a durable secure seal. It is also conceivable that each seal is mostly S-shaped in its cross section, thus corresponding to the abutment surfaces.

In another preferred embodiment of the roof opening system according to the invention, a longitudinal bar is formed on each of the two sides of a vertical longitudinal center plane of vehicle roof base frame and extends in the longitudinal direction of the vehicle when in the assembly position of the vehicle roof base frame and comprises a forward bar section arranged on the longitudinal leg and a rearward bar section arranged on the transverse leg.

In another preferred embodiment of the roof opening system according to the invention, the seals each comprise a bar block which forms a bar section of the longitudinal bar when in the assembly position. The bar block can be clamped between the forward bar section and the rearward bar section. Thus, a durable secure seal is realized. Moreover, the bar block seals the vehicle interior in the area of the longitudinal bar.

According to another preferred embodiment of the roof opening system, the roof opening system comprises a textile covering element which can be displaced between a closed position, in which it covers the roof opening, and an open position, in which the roof opening is open, by means of at least one tensioning bow which can be pivoted with respect to the vehicle roof base frame. The tensioning bow is therefore an actuating element of the roof opening system realized like a folding roof. The actuation of the tensioning bow indicates the position and the tensioning condition of the textile cover element.

Further advantages and advantageous embodiments of the invention's subject matter can be taken from the description, the drawing and the claims.

BRIEF DESCRIPTION OF THE DRAWINGS

Exemplary embodiments of a vehicle roof base frame according to the invention are illustrated in the drawing in a schematically simplified manner and are further described in the following description. In the figures.

DETAILED DESCRIPTION

Figure 1:
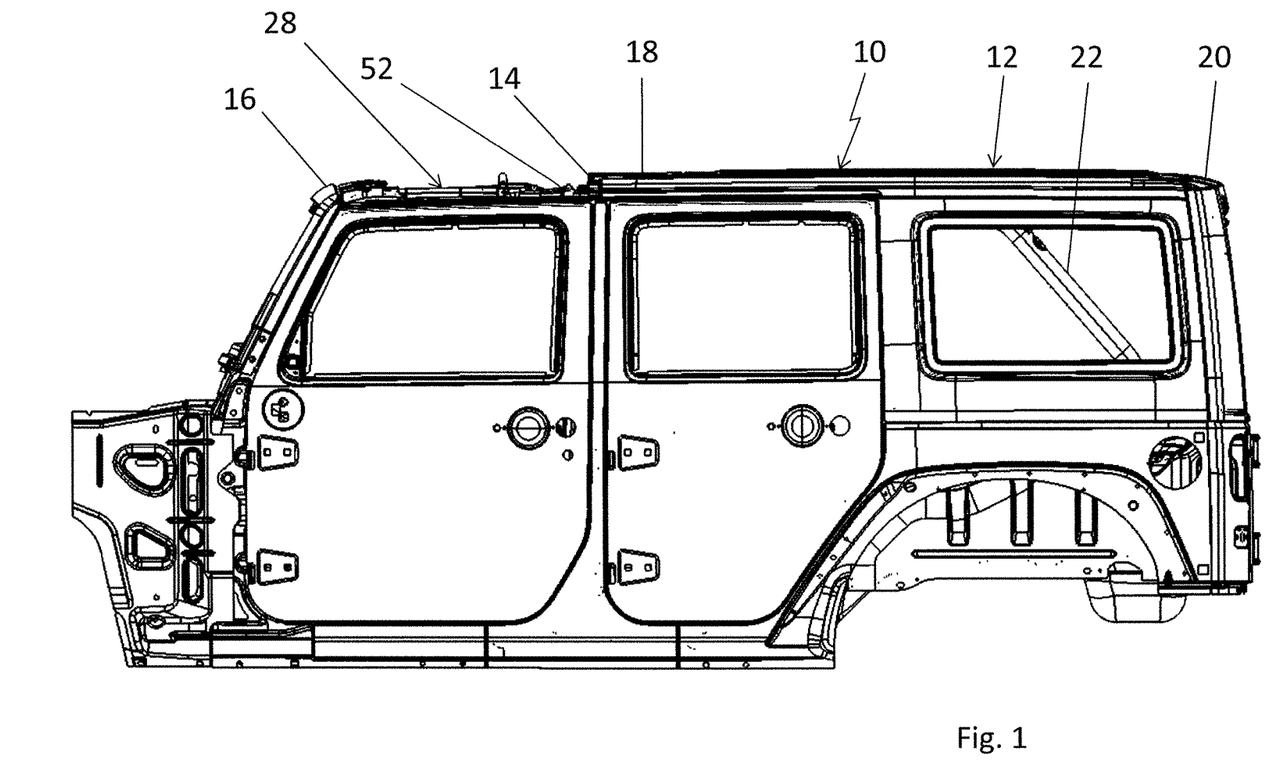
FIG. 1 illustrates a side view of a vehicle structure having a roof opening system in the closed position.

In the drawing, a vehicle structure 10 is illustrated which is a component of a passenger car realized as an off-road vehicle and which comprises a vehicle roof 12 provided with a roof opening 14 which is arranged above a driver's seat and a passenger seat. The roof opening 14 is arranged adjacent to a forward windshield apron 16 with its forward edge, said windshield apron 16 forming an upper frame leg of a windshield frame extending in the transverse direction of the vehicle. At the vehicle rear, the roof opening 14 is arranged adjacent to a fixed-roof section 18 which extends to a rearward roof edge 20. Relative to a vertical longitudinal center plane of the roof, the roof opening 14 is delimited on each side by a tube-like longitudinal roof beam 22 which can be a component of a rollover protection system of the vehicle structure 10 and is to be seen as a component of the roof structure. In FIG. 1, a rearward extension of the two longitudinal roof beams 22 is illustrated, which extend downward at an angle into a rearward trunk area of the vehicle structure 10.

The roof opening 14 can be closed by means of a textile covering element 42 of a roof opening system 28, which can be realized as an interchangeable insert and extends to the forward windshield apron 16 at the vehicle front and to the fixed-roof section 18 at the vehicle rear. The roof opening system 28 comprises a vehicle roof base frame 52 which can be placed on top of an edge area of the vehicle roof 12 delimiting the roof opening 14.

Figure 2:
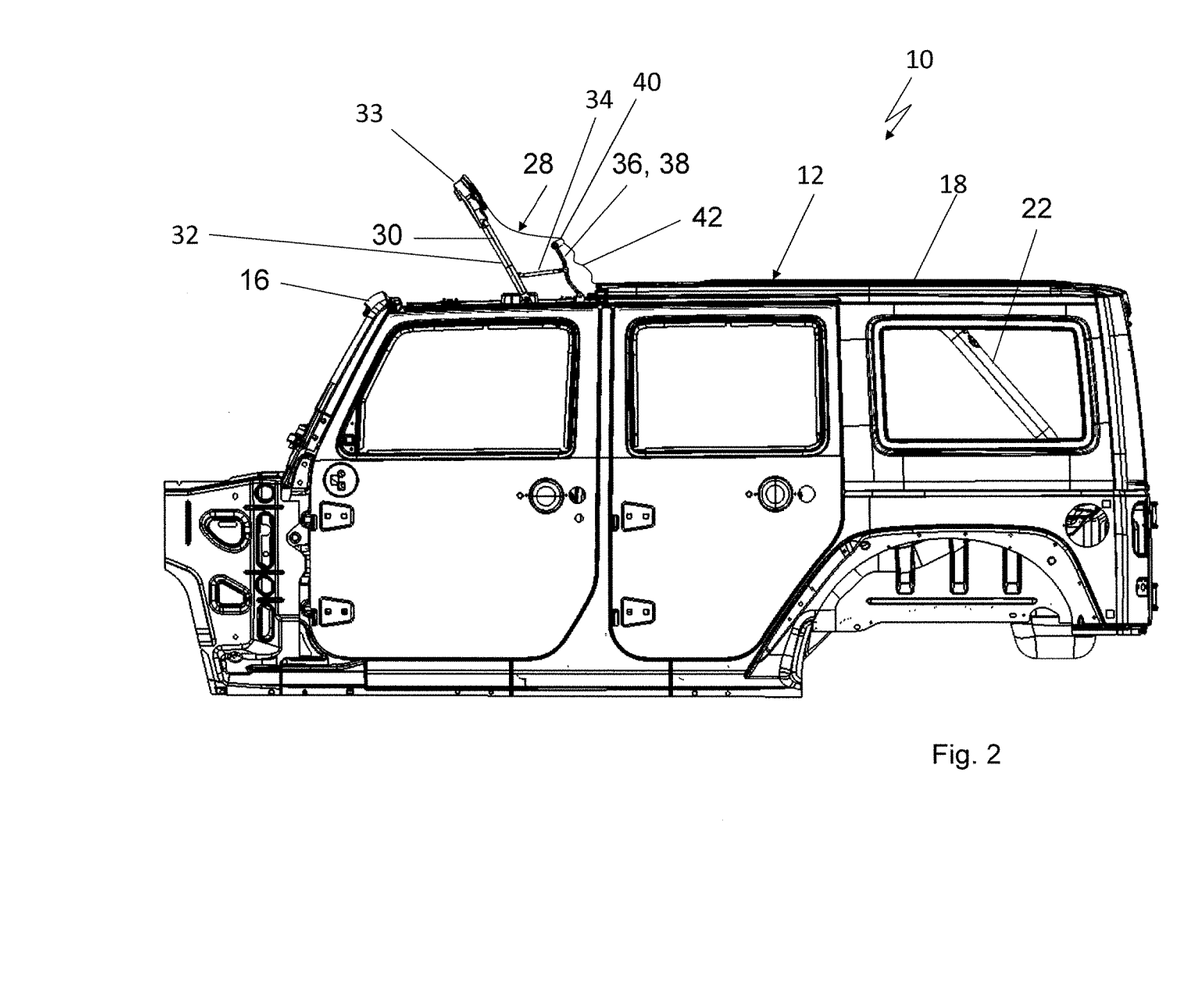
FIG. 2 illustrates a view according to FIG. 1, though with the roof opening system in an intermediary position.

As FIG. 2 illustrates, the roof opening system 28 comprises a main tensioning bow 30 which is essentially U-shaped and which is hinged to longitudinal legs 54, 56 of the vehicle roof base frame 52 via its free legs 32 by means of hinge points. The free legs 32 of the main tensioning bow 30 are connected to each other at their ends facing away from the hinge points via a transverse bow 33 which forms a forward edge of the roof opening system 28 when in the closed position illustrated in FIG. 1, said forward edge abutting against the forward windshield apron 16 of the vehicle structure 10. The transverse bow 33 is a forward bow of the roof opening system 28.

The two free legs 32 of the main tensioning bow 30 are each connected to a coupling link 34 via a hinge point, said coupling link 34 being hinged to a U-shaped auxiliary tensioning bow 36 via a hinge point. The auxiliary tensioning bow 36 comprises a leg 38 on each of its two sides which is hinged in the rearward end area of the respective longitudinal leg 54, 56 of the base frame 52 via a hinge point. The two legs 38 are connected to each other at their ends facing away from the hinge point via a transverse bow 40 representing an intermediary bar.

Figure 3:
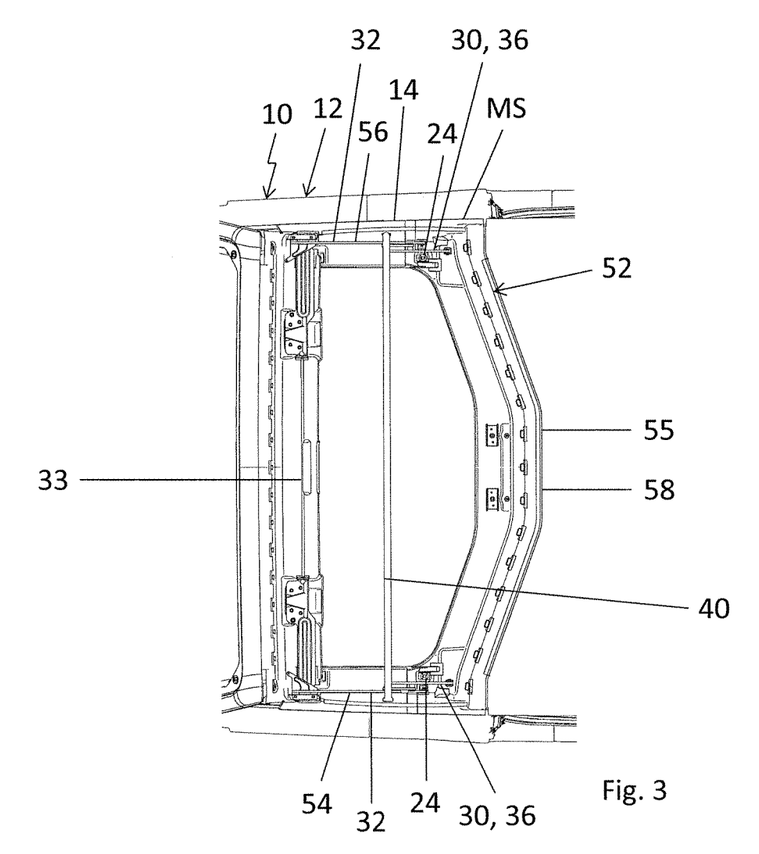
FIG. 3 illustrates a top view of a roof of the vehicle structure.

The tensioning-bow arrangement formed by the main tensioning bow 30, the auxiliary tensioning bow 36 and the coupling links 34 serves for spanning the textile covering element 42 which spans the roof opening 14 when in the closed position shown in FIGS. 1 and 3 and which opens the roof opening 14 in the area surrounded by the vehicle roof base frame 52 when in its open position. When in the closed position, the main tensioning bow 30 can be fixed to the forward windshield apron 16 by means of two closing tabs.

The edge of the textile covering element 42 arranged at the front of the vehicle in the longitudinal direction of the vehicle is connected to the transverse bow 33 of the main tensioning bow 30 and the rearward edge is fastened to the transverse leg 55 of the base frame 52.

The vehicle roof base frame 52 according to the embodiment illustrated in the drawing comprises, relative to the vertical longitudinal center plane of the roof, a left longitudinal leg 54, a right longitudinal leg 56 and a transverse leg 55 which connects the two longitudinal legs 54 and 56. The legs 54, 55 and 56 are realized as separate parts. The legs 54, 55 and 56 are arranged together in a mostly horizontal plane when in the assembly position MS illustrated in FIG. 3 and are firmly connected to each other. The two longitudinal legs 54 and 56 extend mostly parallel to each other and each longitudinal leg 54, 56 includes a mostly right angle using a base section 58 of the transverse leg 55. The vehicle roof base frame 52 thus comprises a roughly U-shaped outline.

The vehicle roof base frame 52 can be fixed to the vehicle roof 12 by means of several handle screws 24. The handle screws 24 are manually detachable fixing elements which engage through the vehicle roof 12 from underneath and engage with corresponding threads of holes 82 and 84 of the vehicle roof base frame 52 from underneath.

Figures 8, 9:
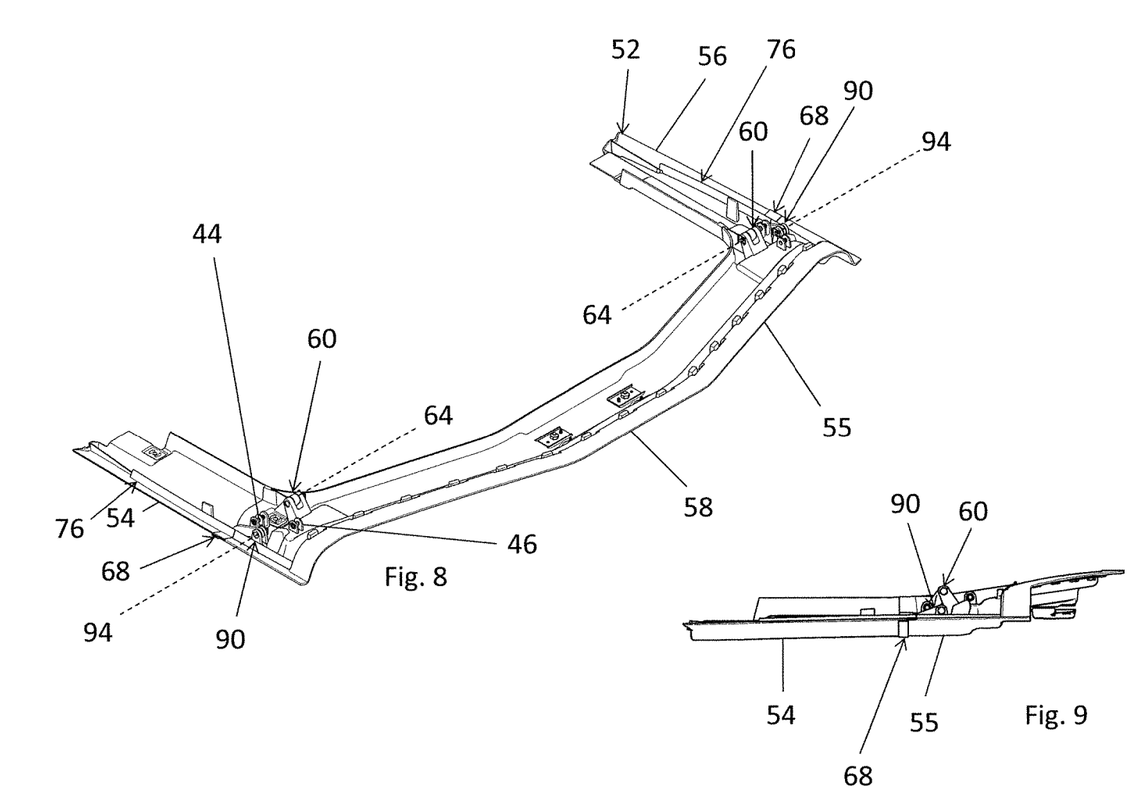
FIG. 8 illustrates a perspective view of a vehicle roof base frame according to a second embodiment when in the assembly position.
FIG. 9 illustrates a side view of the vehicle roof base frame according to FIG. 8.
Figure 10:
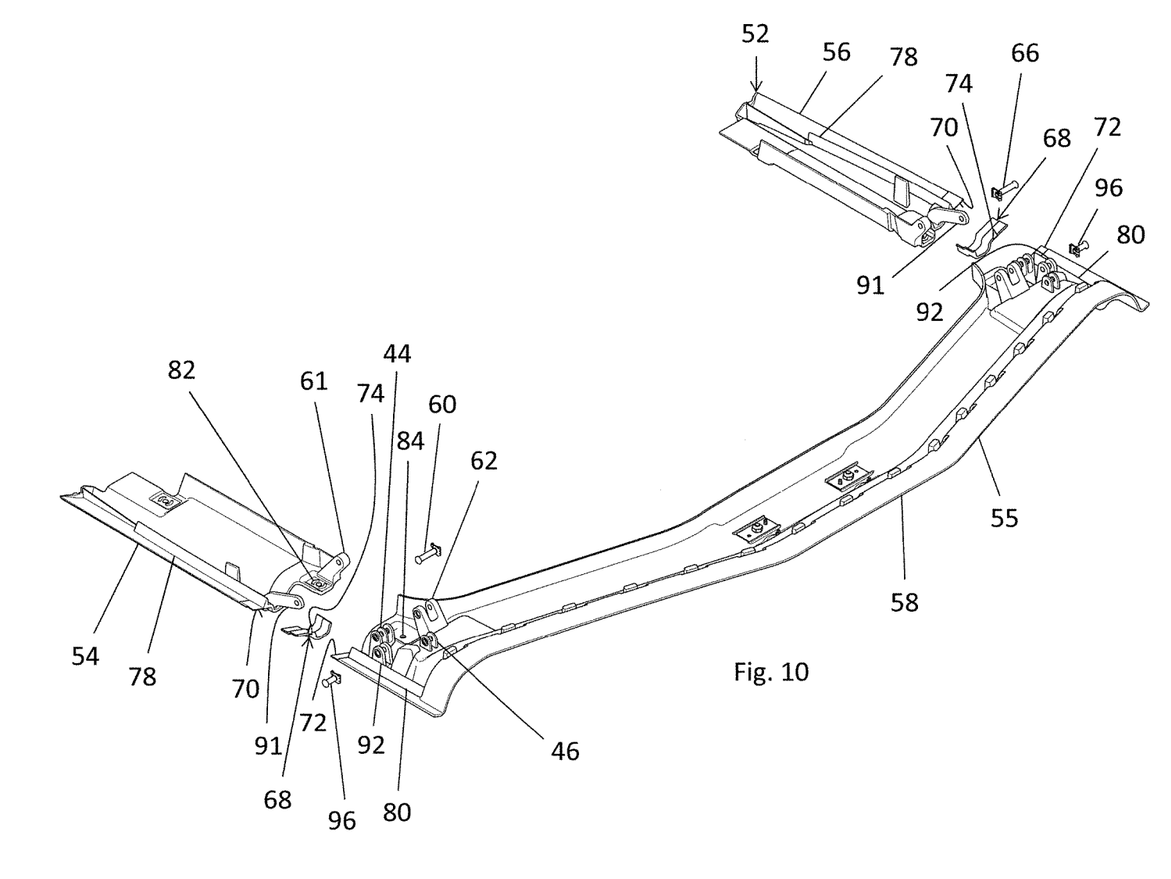
FIG. 10 illustrates an explosive view of the vehicle roof base frame according to FIG. 8.

The vehicle roof base frame 52 illustrated in FIG. 3 according to a first embodiment as well as the vehicle roof base frame 52 illustrated in FIG. 8 according to a second embodiment each comprise a first bearing bracket 44 arranged on the transverse bow 55 for connecting the free legs 32 of the main tensioning bow 30. Moreover, each vehicle roof base frame 52 comprises a second bearing bracket 46 arranged on the transverse bow 55 for connecting the free legs 38 of the auxiliary tensioning bow 36.

Figures 4, 5, 6:
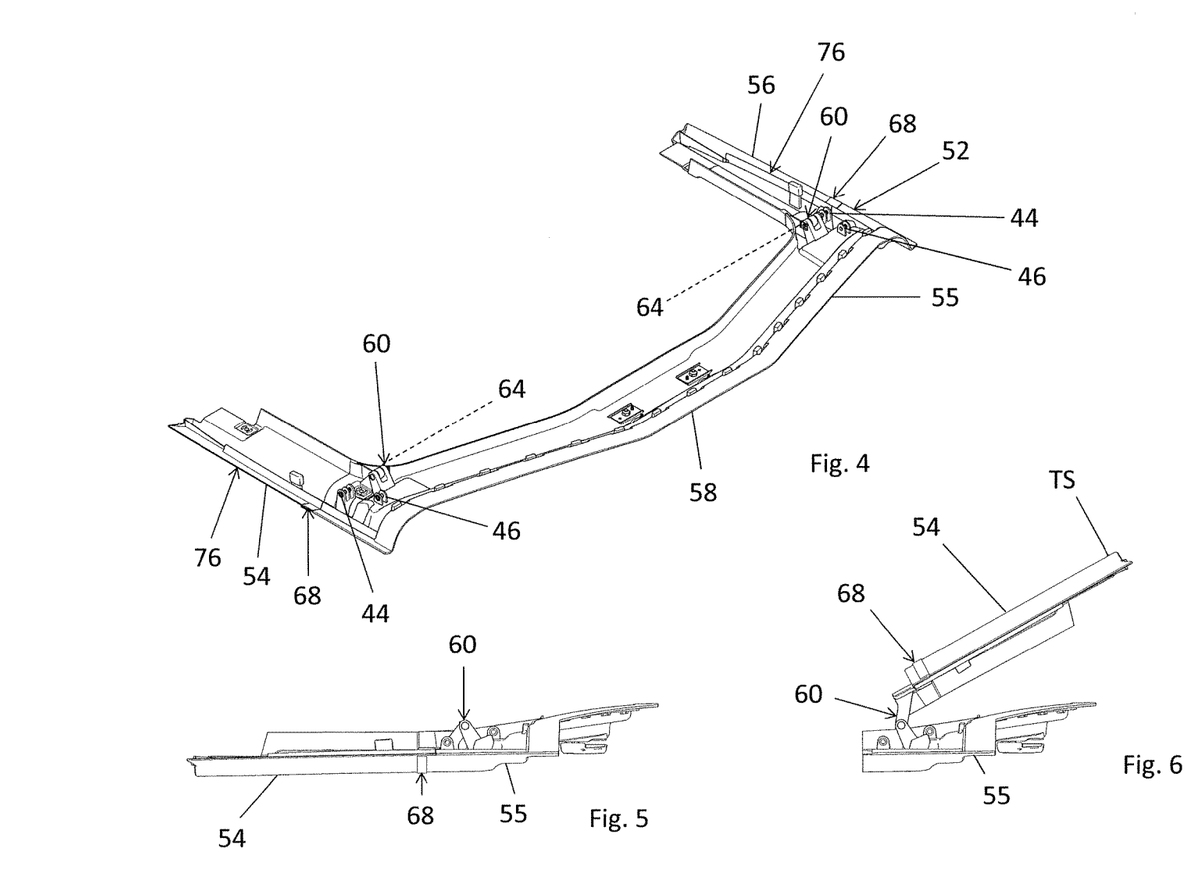
FIG. 4 illustrates a perspective view of a vehicle roof base frame of the roof opening system according to a first embodiment when in the assembly position.
FIG. 5 illustrates a side view of the vehicle roof base frame according to FIG. 4.
FIG. 6 illustrates a side view of the vehicle roof base frame according to FIG. 4 when in the transport position.

The vehicle roof base frame 52 illustrated in FIGS. 4 to 7 according to a first embodiment is characterized in particular in that each longitudinal leg 54, 56 is hinged to the transverse leg 55 via a hinge 60. As in particular FIG. 6 illustrates, each hinge 60 comprises a forward hinge receptacle 61 arranged on a longitudinal leg 54, 56 and a rearward hinge receptacle 62 arranged on the transverse leg 55. A pivot axis 64 engages through each hinge 60 and extends parallel to the transverse leg 55 or rather its base section 58. Moreover, each hinge 60 comprises a hinge pin 66 which engages through the forward hinge receptacle 61 and the rearward hinge receptacle 62 along the pivot axis 64.

Due to the vehicle roof base frame 52 being realized in separate parts, bumper areas are formed between adjoining legs 54, 55 and 56. A seal realized as a flat seal 68 is arranged in each of the respective bumper areas between the left longitudinal leg 54 and the transverse leg 55 as well as between the right longitudinal leg 56 and the transverse leg 55. Each flat seal 68 comprises an essentially square outline and engages an abutment surface 70 of the respective longitudinal legs 54, 56 from underneath. Moreover, each flat seal engages over an abutment surface 72 of the transverse leg 55. In its cross section, each flat seal 68 is mostly S-shaped, thus corresponding to the arrangement of the abutment surfaces 70 and 72 on the longitudinal legs 54 and 56 and the transverse leg 55. Each flat seal 68 moreover comprises a bar block 74. The bar block 74 forms a bar section of a longitudinal bar 76 when in the assembly position MS. A longitudinal bar 76 is formed on the vehicle roof base frame 52 on both sides of the vertical longitudinal center plane of the roof and extends in the longitudinal direction of the vehicle when in the assembly position MS. Each longitudinal bar 76 comprises a forward bar section 78 arranged on the longitudinal leg 54, 56, a rearward bar section 80 arranged on the transverse leg 55 as well as the bar block 74 of the respective flat seal 68. In other words, each bar block 74 aligns flush with the corresponding forward bar section 78 and the corresponding rearward bar section 80.

In order to be fastened to the vehicle roof 12, the vehicle roof base frame 52 comprises two pairs of holes which are each formed from a hole 82 formed on the longitudinal leg 54, 56 and from a hole 84 formed on the transverse leg 55. The two holes 82 and 84 of a pair of holes align flush with each other when in the assembly position MS and a handle screw 24 engages through each hole 82, 84 for fastening the vehicle roof base frame 52.

FIG. 6 illustrates a transport position TS of the vehicle roof base frame 52 according to the first embodiment. When in this transport position TS, a small transport volume is enabled by the two longitudinal legs 54 and 56 being folded onto the transverse leg 55 via their respective hinge 60. Thus, the upper sides of each longitudinal leg 54, 56 are arranged opposite the upper side of the transverse leg 55. When in this transport position TS, the flat seals 68 are already pre-assembled on the longitudinal legs 54 and 56. The flat seals 68 can be pre-assembled by means of clamps or an adhesive. Alternatively, the flat seals 68 can be assembled by the customer.

Figure 7:
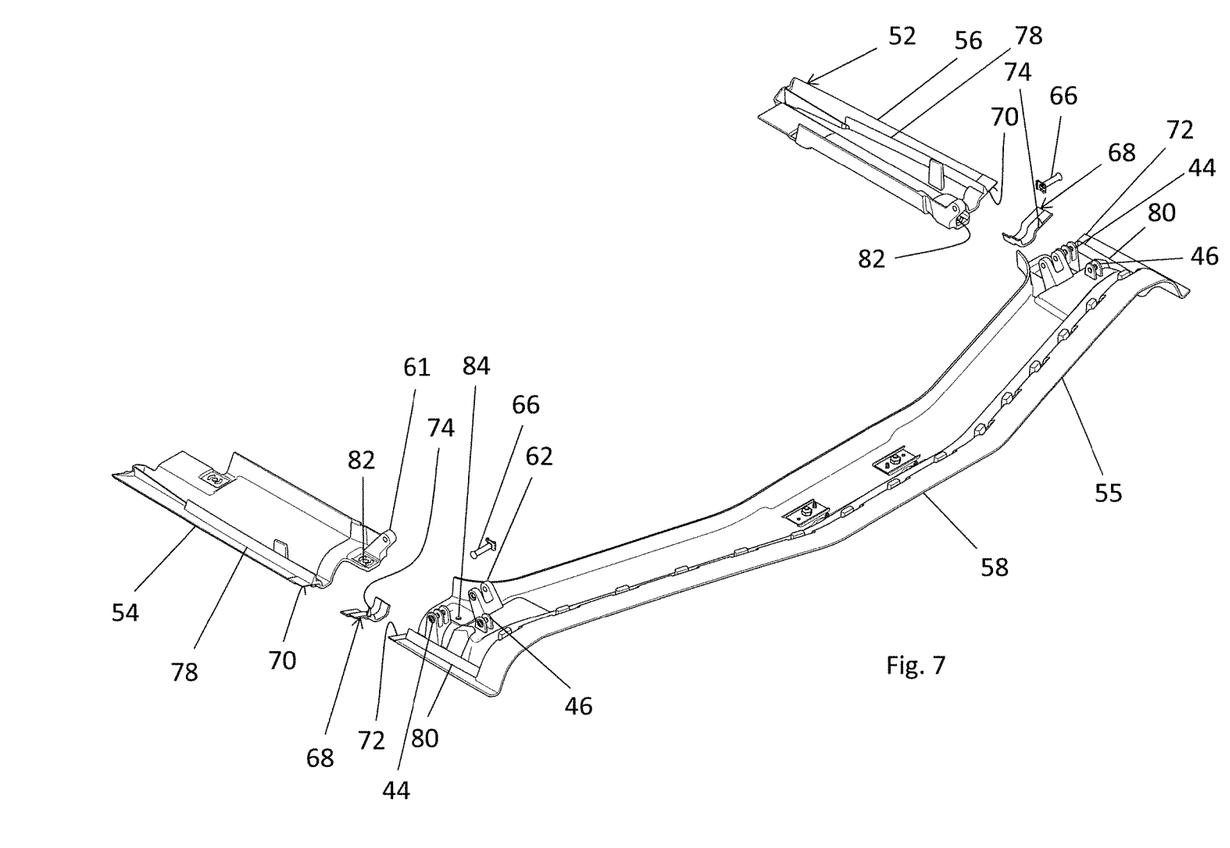
FIG. 7 illustrates an explosive view of the vehicle roof base frame according to FIG. 4.

FIGS. 7 to 9 illustrate the vehicle roof base frame 52 according to a second embodiment, with the differences to vehicle roof base frame 52 according to the first embodiment being described in the following.

The second embodiment of the vehicle roof base frame 52 differs to the first embodiment in particular in that the two longitudinal legs 54 and 56 are not connected to the transverse leg 55 when in the transport position TS.

For realizing the assembly position MS, the longitudinal legs 54 and 56 must consequently be connected to the transverse leg 55, which can be carried out by an end customer. It can be seen in FIG. 7 that the vehicle roof base frame 52 comprises a rivet receptacle arrangement 90 on both sides of the longitudinal center plane of the roof. As can be seen in particular in FIG. 9, each longitudinal leg 54 and 56 comprises a forward rivet receptacle 91. Moreover, the transverse leg 55 comprises two rearward rivet receptacles 92 which each form a rivet receptacle arrangement 90 in conjunction with the forward rivet receptacles 91. A rivet 96 engages through each rivet receptacle arrangement 90 in order to fasten the respective longitudinal leg 54, 56 to the transverse leg 55. Alternatively or additionally, the hinge 60 described in regard of the first embodiment can also be present for fastening the legs 54, 55, and 56 together.

A rivet axis 94 engages through each rivet receptacle arrangement 90 and extends parallel to the base section 58 of the transverse leg 55 and can extend parallel to the pivot axis 64 of the hinge 60 on the respective side regarding the vertical longitudinal center plane of the roof.

The invention claimed is:

1. A roof opening system for closing or at least partially opening a roof opening as required, the roof opening system being realized as an interchangeable insert and having a vehicle roof base frame which can be placed on top of an edge area of a vehicle roof structure limiting the roof opening, comprising: two longitudinal legs and a transverse leg connecting the two longitudinal legs to each other, the legs being realized as separate parts, wherein a seal is arranged between each of the longitudinal legs and the transverse leg when in an assembly position in which the legs are firmly connected to each other, and wherein the two longitudinal legs are each arranged on the transverse leg via a hinge.

2. The roof opening system according to claim 1, wherein the pivot axis of the hinges extends transversely.

3. The roof opening system according to claim 1, wherein the two longitudinal legs are connected to the transverse leg by means of screws and/or rivets when in the assembly position.

4. The roof opening system according to claim 1, wherein the roof opening system can be fastened to the vehicle roof structure via manually detachable fixing elements.

5. The roof opening system according to claim 1, wherein the seals have substantially planar upper surfaces.

6. The roof opening system according to claim 1, wherein the seals are arranged in such a manner when in the assembly position that each seal engages an abutment surface of the corresponding longitudinal leg from underneath and engages over an abutment surface of the corresponding transverse leg.

7. A roof opening system for closing or at least partially opening a roof opening as required, the roof opening system being realized as an interchangeable insert and having a vehicle roof base frame which can be placed on top of an edge area of a vehicle roof structure limiting the roof opening, comprising: two longitudinal legs and a transverse leg connecting the two longitudinal legs to each other, the legs being realized as separate parts, wherein a seal is arranged between each of the longitudinal legs and the transverse leg when in an assembly position in which the legs are firmly connected to each other, wherein a longitudinal bar is realized on both sides of a vertical longitudinal center plane of the vehicle roof base frame and extends in the longitudinal direction of the vehicle when in the assembly position and comprises a forward bar section arranged on the longitudinal leg as wells as a rearward bar section arranged on the transverse leg, and wherein the seals each comprise a bar block which forms a bar section of the longitudinal bar when in the assembly position.

8. The roof opening system according to claim 1, wherein the roof opening system comprises a textile covering element which can be displaced between a closing position, in which it covers the roof opening, and an open position, in which the roof opening is open, by means of at least one tensioning bow, which can be pivoted with respect to the vehicle roof base frame.

* * * * *